UNITED STATES PATENT OFFICE.

ERNST W. RUDOLF SCHRÖTER, OF HAMBURG, GERMANY, ASSIGNOR TO ICHTHYOL GESELLSCHAFT, CORDES, HERMANNI & CO., OF SAME PLACE.

PROCESS OF MAKING PURE SULFONIC COMPOUNDS.

SPECIFICATION forming part of Letters Patent No. 513,204, dated January 23, 1894.

Application filed October 27, 1892. Serial No. 450,147. (No specimens.)

*To all whom it may concern:*

Be it known that I, ERNST W. RUDOLF SCHRÖTER, a subject of the Emperor of Germany, residing at Hamburg, in the German Empire, have invented certain new and useful Improvements in the Production of Sulfonic Acids and their Salts from Hydrocarbons Containing Sulfur Chemically Combined, of which the following is a specification.

My invention relates to the production of pure sulfonic acids and their salts from hydrocarbons containing sulfur in chemical combination, and more particularly the so called ichthyolsulfur acid and its salts, my said invention being an improvement on the process of obtaining crude or impure sulfonic acids described in Letters Patent of the United States granted to me May 26, 1885, No. 318,662.

My present invention has for its object the provision of means whereby sulfonic acids and their salts are obtained in such a pure state as to adapt them for internal as well as for external use as remedial agents without danger of injurious or fatal results either in their normal condition or in the form of solutions, or in combination with other substances or chemicals.

In carrying out my invention I proceed from the crude sulfonic acids as obtained by the process described in my Letters Patent above referred to, which are dissolved in water, and have, when so dissolved, the following chemical formula

and to the preferably filtered and moderately heated solution I add hydrochloric acid until said solution assumes a lighter color. The addition of hydrochloric acid results in the separation of the sulfonic acid from its aqueous solution, said acid being precipitated in the form of a dark green molasses-like substance, the non-sulfonized hydrocarbons $C_mH_nS$ collecting on top of the water in the form of an oily film, while the mineral acids $H_2SO_4+H_2SO_3$ are held in solution. The precipitate is now separated from the aqueous constituents and treated with an aqueous solution of hydrochloric acid, after which it is washed in pure water. Should the sulfonic compound thus obtained still contain foreign substances, the process of treatment with hydrochloric acid and afterward washing in pure water is repeated until a pure sulfonic compound is obtained, any remaining traces of hydrochloric acid being eliminated either by evaporation, by expressing the same or by expelling the acid water in a centrifugal machine, or by diffusion or in any other well-known or preferred manner. The pure sulfonic compound $C_xH_yS(SO_3H)^z$ thus obtained may be converted into corresponding salts by neutralizing the same either with a free base or with carbonic acid salts. In this manner an ammonium salt may be obtained by adding ammonia to an aqueous solution of the pure sulfonic compound until the solution is neutralized. Other salts may also be obtained by the addition to the solution of pure sulfonic compound of hydrate of sodium or potassium and other free bases or their carbonates, as carbonate of soda, carbonate of lithium, or carbonate of zinc, and the like.

In the use of carbonates, as of zinc, the sulfonic compounds being the more effective acid present displaces the carbonic acid, which is liberated in the form of a gas, and combines with the remaining bases. The excess of water after the reaction has taken place may be eliminated by evaporation.

The sulfonic products obtained by the described process either pure or combined with other substances, as for instance ichthyol ammonium, are particularly applicable for internal use as remedial agents, and said sulfonized products can be combined with other substances such as carbolic acid, salicylic acid, creosote, iodine, &c., for use as lotions or for internal use in the form of pills, lozenges, capsules, tablets, &c.

The sulfonic products described have proved an efficient remedy in all diseases of the stomach, bowels, kidneys, liver, throat, genital and pelvic organs, &c. In general they have proved efficacious in inflammatory as well as infectious diseases.

Having thus described my invention, what I claim as new, and desire to secure by Letters Patent, is—

1. The process of obtaining sulfonic compounds of mineral oils which consists in treating an aqueous solution of a crude sulfonic compound with hydrochloric acid, separating the precipitated sulfonic compound and purifying the same.

2. The process of obtaining sulfonic compounds of mineral oils which consists in treating an aqueous solution of a crude sulfonic compound with hydrochloric acid, separating the precipitated sulfonic compound, again treating the same with hydrochloric acid and eliminating the last-named acid.

3. The process of obtaining sulfonic compounds, which consists in treating a hydrocarbon containing sulfur in chemical combination with concentrated sulfuric acid, and purifying the crude sulfonic compound obtained by treating the same with hydrochloric acid, separating the precipitated sulfonic compound, treating the same again with hydrochloric acid and removing the last-named acid.

In testimony that I claim the foregoing as my invention I have signed my name, in presence of two witnesses, this 13th day of October, 1892.

ERNST W. RUDOLF SCHRÖTER.

Witnesses:
ALEXANDER SPECHT,
DIEDRICH PETERSEN.